(12) United States Patent
Liu

(10) Patent No.: US 6,785,202 B1
(45) Date of Patent: Aug. 31, 2004

(54) MAGNETIC RESTORING DEVICE OF AN ACTUATOR

(75) Inventor: Chin-Sung Liu, Miao-Li (TW)

(73) Assignee: Acute Applied Technologies, Inc., Chutung (TW)

( * ) Notice: Subject to any disclaimer, the term of this patent is extended or adjusted under 35 U.S.C. 154(b) by 0 days.

(21) Appl. No.: 09/385,830

(22) Filed: Aug. 30, 1999

(51) Int. Cl.[7] ................................................ G11B 7/00
(52) U.S. Cl. .............................. 369/44.22; 369/44.14
(58) Field of Search ........................ 369/44.11, 44.14, 369/44.15, 44.16, 44.22, 112; 359/813, 814, 823, 824

(56) References Cited

U.S. PATENT DOCUMENTS

| | | | | |
|---|---|---|---|---|
| 4,646,283 A | * | 2/1987 | Ito et al. ............... | 369/44.15 X |
| 4,750,164 A | * | 6/1988 | Nose ................... | 369/44.15 X |
| 4,792,935 A | * | 12/1988 | Kime et al. .............. | 369/44.22 |
| 4,998,802 A | * | 3/1991 | Kasuga et al. ........ | 369/44.22 X |
| 5,046,820 A | * | 9/1991 | Saekusa et al. ...... | 369/44.15 X |
| 5,128,806 A | * | 7/1992 | Ohno ................... | 369/44.15 X |
| 5,208,703 A | * | 5/1993 | Ikegame et al. ..... | 369/44.15 X |
| 5,548,449 A | * | 8/1996 | Matsui et al. ........ | 369/44.15 X |

* cited by examiner

Primary Examiner—Paul W. Huber
(74) Attorney, Agent, or Firm—W. Wayne Liauh

(57) ABSTRACT

A magnetic restoring device of actuator provides a sufficient magnetic restoring force for stably holding a movable part of actuator in a neutral position. The actuator acts as an objective lens driving device in an optical pickup. A non-contact magnetic restoring mechanism is provided for causing pickup to return to a neutral position after a focusing or tracking operation. The magnetic restoring device comprises magnets, two magnetic inductive members, and two yokes wherein magnets and yokes are opposite; one arc-shaped surface is formed on the magnet in the focusing direction; and the other one is formed on the magnet in the tracking direction. The magnetic inductive members are provided between the magnets and the yokes to form a magnetic circuit, thereby increasing a magnetic field intensity and sensitivity of actuator. The device increases a magnetic restoring force in the focusing and tracking directions respectively.

5 Claims, 3 Drawing Sheets

MAGNETIC RESTORING DEVICE OF AN ACTUATOR

BACKGROUND OF THE INVENTION

1. Field of Invention

The present invention relates to a magnetic restoring device of an actuator, and more particularly to an objective lens driving device in an optical pickup.

2. Related Art

Conventionally, in an optical disk device using an optical disk as a recording medium, an optical pickup is used for reading out information pits in which information signals are written on disk. In such optical pickup it is necessary to focus precisely a laser beam to these information pits on the disk. For this purpose, an objective lens driving device is used, which moves an objective lens two-dimensionally in the direction of an optical axis, i.e., according to a focusing signal, and in the tracking direction against deviations or oscillation of the disk. At least four properties are required to this objective lens driving device, such as 1) having a high sensitivity, 2) being excellent in dynamic characteristics such as the ability of following in a high frequency region, 3) being small, and 4) being not expensive.

A shaft/sleeve based actuator for positioning is widely employed in a conventional driving device of optical pickup. The position of a movable part of actuator has the tendency of moving down due to the effect of gravity. As such, a number of techniques have been proposed for maintaining a movable part of actuator in a neutral position, i.e., an equilibrium position when no force is applied on the movable part. For example, U.S. Pat. No. 4,792,935 discloses adding a resilient support member on the movable part of actuator. But this is unsatisfactory for increasing the difficulty of assembly due to the adding of additional support components. Another related art is disclosed in U.S. Pat. No. 4,998,802 which causes the movable part of actuator returning to neutral position by designing that a magnetic attractive force of the magnetic portion for focusing acts on a thin magnetic piece and at the same time a restoring force acts thereon, which is about equal to the restoring force so that the magnetic piece has a tendency to be stably held at the maximum point of the magnetic flux. But this is unsatisfactory due to attractive force and restoring force are not about equal each other if the magnets have a poor quality in forming a thrusting force on the support journal, thereby increasing friction force when magnetic piece is actuated. Further, the magnetic restoring force is not sufficient. Another related art proposes an improved technique for keeping magnetic piece in an equilibrium position. However, no proposition has been provided to increase magnetic restoring. As far as we know, a sufficient magnetic restoring force is a must for smoothly operating the actuator. Thus a need exists for solving the above drawbacks of related art.

SUMMARY OF THE INVENTION

It is an object of the present invention to provide a magnetic restoring device of an actuator having the capability of providing a sufficient magnetic restoring force for stably holding a movable part of a actuator in a neutral position.

The advantages of the present invention are realized by providing a novel actuator acting as an objective lens driving device in an optical pickup comprising a lens holder, a voice coil motor, two magnetic inductive members, and two yokes. The lens holder has a support journal for supporting the objective lens. The voice coil motor includes a base, a focusing coil provided on lens holder, a tracking coil provided on the lens holder, and a plurality of magnets provided on the base such that an electromagnetic effect is formed when a driving current is made to flow through the focusing and tracking coils respectively which being exposed to the influence of a magnetic field of a corresponding magnetized magnet, thereby moving the lens holder along the support journal to effect a focusing operation for the optical pickup, and oscillating the lens holder along the support journal to effect a tracking operation for the optical pickup. The magnetic inductive members are provided between the magnets and the yokes to form a magnetic circuit by a magnetized magnet and an adjacent corresponding yoke such that a magnetic restoring force is generated by the magnets for acting on the magnetic inductive member located therebetween. The lens holder accordingly is held at a neutral position by the magnetic restoring support of the magnetic inductive member. The movable part of the actuator is able to cause lens holder to return to its neutral position after the focusing and tracking operations. Further, magnets and yokes are opposite. One arc-shaped surface is formed on the magnet in the focusing direction, and the other one is formed on the magnet in the tracking direction. As such, an increased magnetic restoring force is obtained in the focusing and tracking directions respectively by the magnetic restoring device. By utilizing this, a couple of drawbacks occurred in related art are eliminated such as a thrusting force on the support journal causing an increased friction force when magnetic piece is actuated, and not sufficient magnetic restoring force.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE PREFERRED EMBODIMENTS

Figure 1:
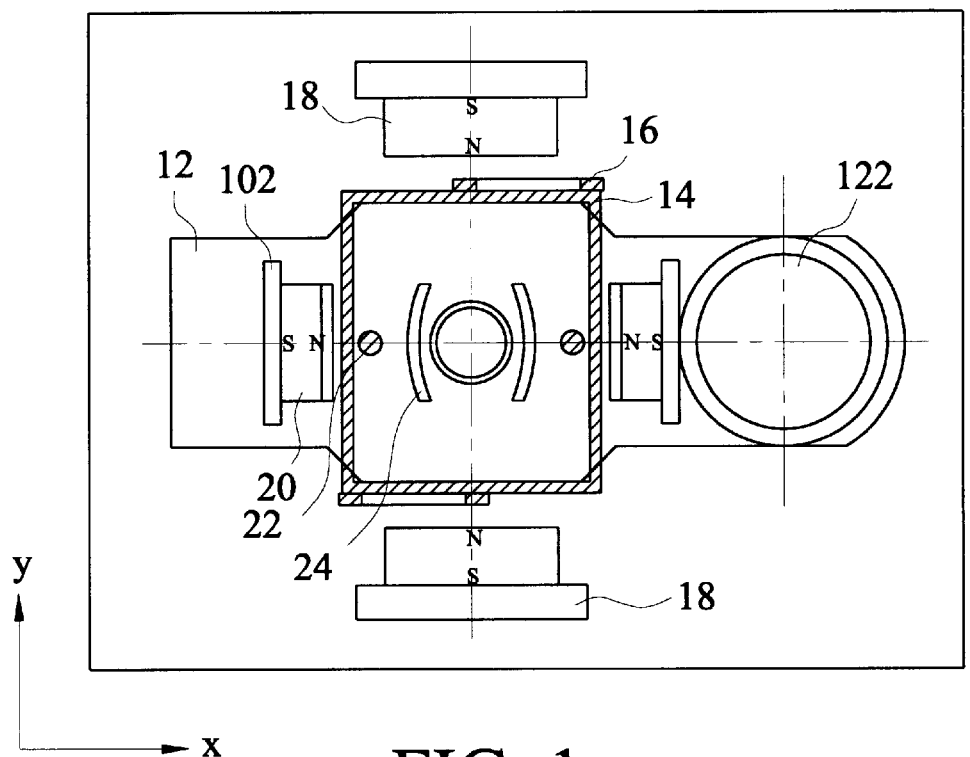
FIG. 1 is a top view of an embodiment of an actuator having a magnetic restoring device of the present invention.
Figure 2:
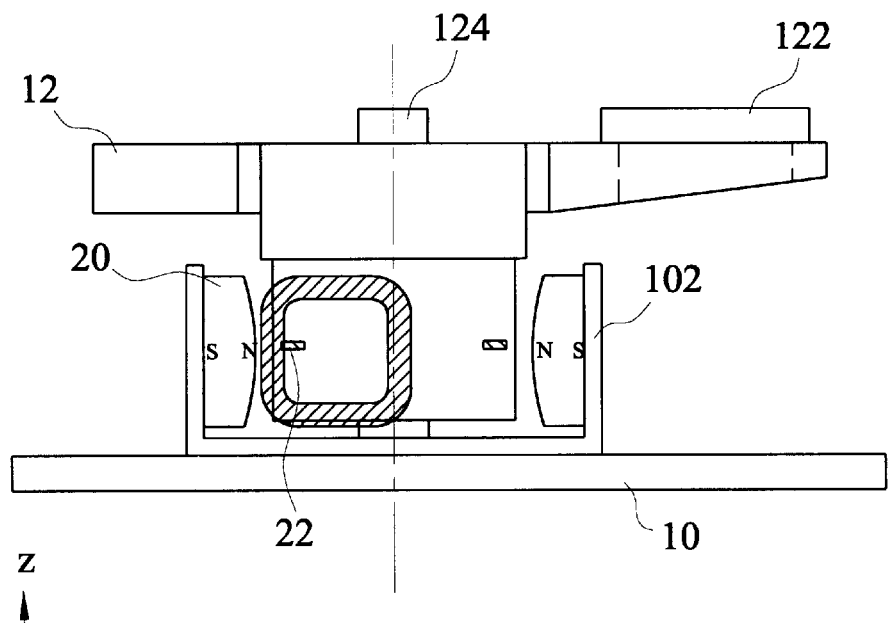
FIG. 2 is a side view of FIG. 1.

Referring to FIGS. 1–2, there is shown an embodiment of an actuator having a magnetic restoring device of the invention. Actuator provided on a voice coil motor 10 comprises a lens holder 12, a focusing coil 14, two tracking coils 16, two pairs of magnets 18 and 20, two magnetic inductive members 22, and two yokes 24 in which an objective lens 122 is provided on lens holder 12 which is supported by a support journal 124 attached to voice coil motor base 10. A movable part of actuator consists of lens holder 12, focusing coil 14, and tracking coils 16.

Voice coil motor acting as a drive source is comprised of voice coil motor base 10, focusing coil 14, tracking coil 16, and two pairs of magnets 18 and 20. Voice coil motor base 10 includes a generally U-shaped yoke base 102. Magnets 20 are disposed on two opposite sides of focusing coil 14. Magnet 20 is secured to the inner side surface of each vertical portion of joke bases 102. Magnets 18 are disposed on another two opposite sides of focusing coil 14. Focusing coil 14 is wound on lens holder 12. Each tracking coil 16 is secured to focusing coil 14 near magnet 18 by means of using a resin binder. When a driving current is made to flow through the focusing coil 14 for driving objective lens 122, the current of focusing coil 14 in x direction shown in FIG. 1 or FIG. 2 is affected by the magnetic field in y direction generated by magnet pairs 18 and 20 and accordingly a thrusting force is generated in z direction. Similarly, the current of focusing coil 14 in y direction is affected by the magnetic field in x direction generated by magnet pairs 18 and 20 and accordingly a thrusting force is also generated in z direction. The z direction is the focusing direction of objective lens 122. Thus the movable part will move along axial direction of support journal 124 to effect focusing. Similarly, when a driving current is made to flow through the tracking coil 16, the current of tracking coil 16 in z direction shown in FIG. 1 or FIG. 2 is affected by the magnetic field in x and y directions and accordingly a thrusting force is generated in x and y directions respectively. In detail, x and y direction thrusting forces are equal and arranged symmetrically with respect to support journal 124. As such, a torque is generated on support journal 124 for causing movable part to move along z direction to effect tracking.

Figure 3:
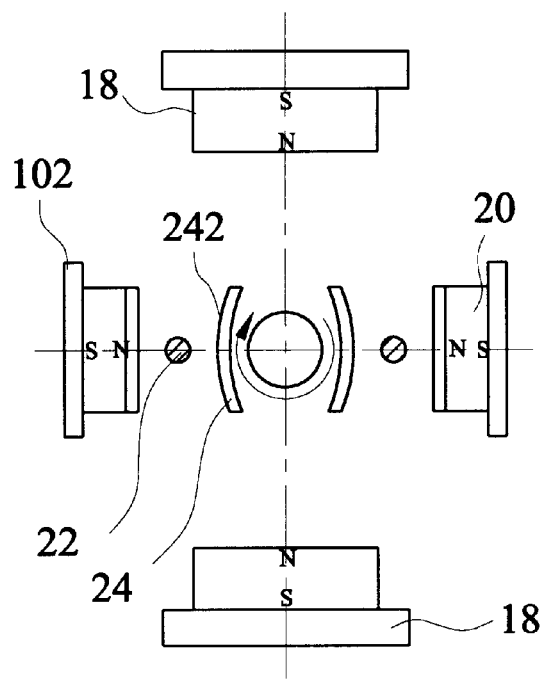
FIGS. 3–4 are top and side views of a first embodiment of magnetic restoring mechanism of actuator of the present invention respectively.
Figure 4:
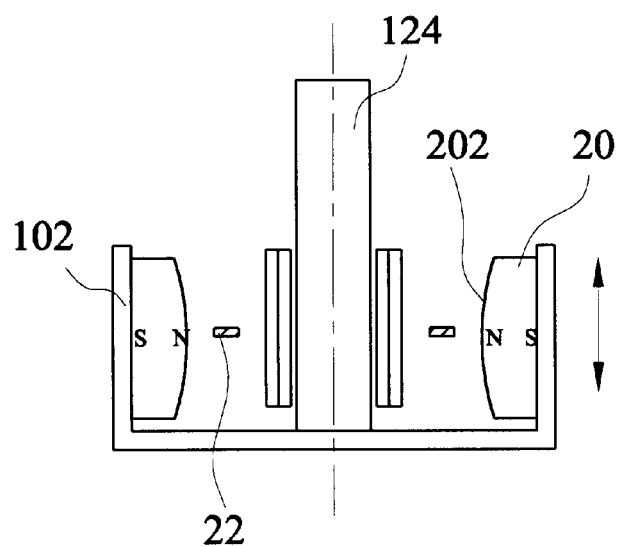

A scheme has been made by the invention for causing the movable part of actuator to return to a neutral position after above movement without being affected by gravity, and provide a magnetic restoring device having a sufficient magnetic restoring. Referring to FIGS. 3–4, there are top and side views of a first embodiment of magnetic restoring mechanism of actuator of the present invention respectively in which the movable part of actuator is stably held in a neutral position. Note that FIGS. 3–4 are schematic views of FIGS. 1–2 respectively.

Magnetic restoring mechanism is constituted by two magnets 20, two magnetic inductive members 22, and two yokes 24. Disposition of the mechanism is symmetrical with respect to support journal 124, i.e., magnetic inductive member 22 and yoke 24 are provided between magnet 20 and support journal 124. Further, magnetic inductive member 22 is provided between magnet 20 and yoke 24. A magnetic circuit is formed by a magnetized magnet 20 and an adjacent corresponding yoke 24 such that a magnetic restoring force is generated by the magnetic field for acting on magnetic inductive member 22 located therebetween. As such, lens holder 12 will be kept at a neutral position by the magnetic restoring force of the magnetic inductive member 22. In addition, movable part of actuator has the capability to cause lens holder 12 to return to its neutral position after focusing and tracking operations.

As stated above, yokes 24 are added to form magnetic circuits between yokes 24 and magnet 20 for generating a magnetic restoring force. This can be viewed as providing internal yokes 22 each corresponding to an external U-shaped yoke base 102. Thus a magnetic circuit such formed has a strong magnetic force.

Arc-shaped surfaces 202 and 242 are formed on each of magnets 20 and yokes 24 respectively, i.e., arc-shaped surfaces 202 and 242 so formed are opposite each other. Further, arc-shaped surface 202 is parallel to the focusing direction (shown by arrow in FIG. 4) of magnet 20, and arc-shaped surface 242 is parallel to the tracking direction (shown by arrow in FIG. 3) of yoke 24.

In brief, novel arc-shaped magnets 20 can increase the magnetic restoring force of the magnetic restoring mechanism in the focusing directions. Further, novel arc-shaped yokes 24 also can increase the magnetic restoring force of the magnetic restoring device in the tracking directions. Furthermore, such formed magnetic circuit can increase magnetic field intensity and sensitivity of actuator.

Figure 5:
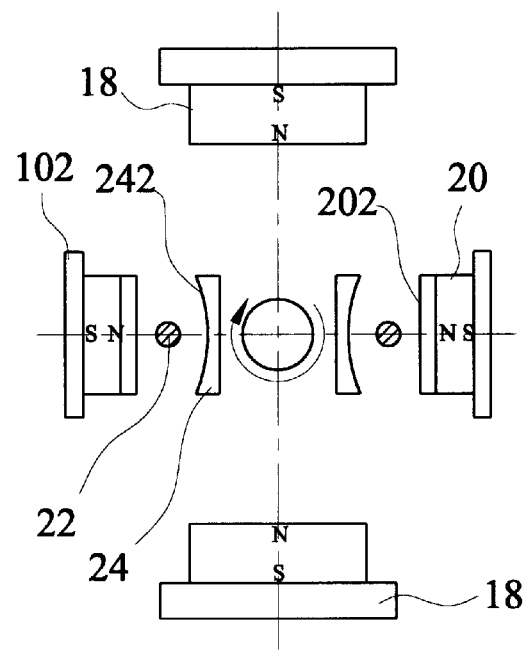
FIG. 5 is a top view of a second embodiment of magnetic restoring mechanism of actuator of the present invention.

FIG. 5, corresponding to FIG. 4, is a top view of a second embodiment of magnetic restoring mechanism of actuator of the invention. It is seen that yokes 24' has a cross-section different than that of above yokes 24. Further, yokes 24' have the same capability of increasing magnetic restoring force for achieving a better tracking of magnetic restoring mechanism.

Figure 6:
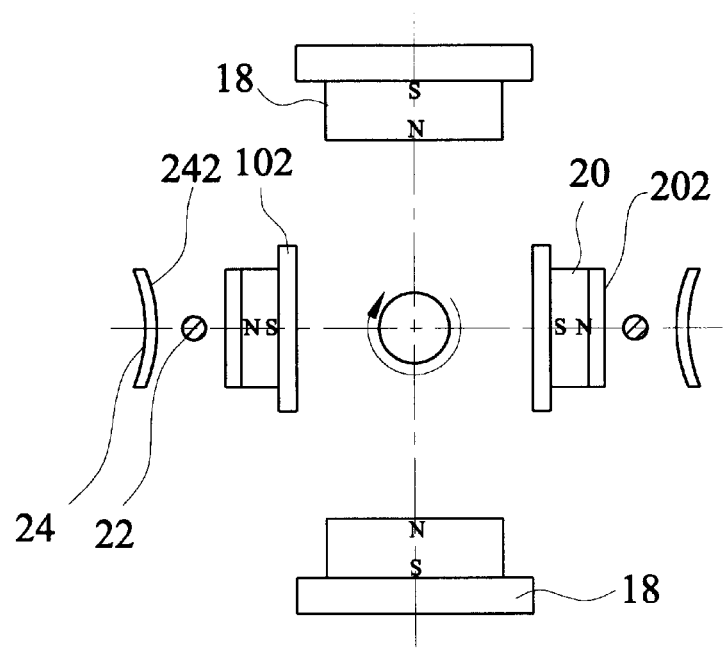
FIG. 6 is a top view of a third embodiment of magnetic restoring mechanism of actuator of the present invention.

FIG. 6 is a top view of a third embodiment of magnetic restoring mechanism of actuator of the invention in which magnetic inductive members 22 and yokes 24 are not provided between two magnets 20 as shown in FIG. 3. To the contrary, two pairs of magnetic inductive members 22 and yokes 24 are arranged symmetrically externally to U-shaped yoke bases 102. Similarly, arc-shaped surfaces 202 and 242 are formed on each of magnets 20 and yokes 24 respectively, i.e., arc-shaped surfaces 202 and 242 so formed are opposite each other. As a result, an increase in magnetic restoring force for achieving a better focusing and tracking of magnetic restoring mechanism is also realized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic restoring device of an actuator acting as an objective lens driving device in an optical pickup comprising:

a lens holder having a support journal for supporting the objective lens;

a voice coil motor including a base, a focusing coil provided on the lens holder, a tracking coil provided on the lens holder, and a plurality of magnets provided on the base such that an electromagnetic effect is formed when a current is made to flow through the focusing and tracking coils respectively which being exposed to an influence of a magnetic field of one of the corresponding magnetized magnets, thereby moving the lens holder along the support journal to effect a focusing operation for the optical pickup, and oscillating the lens holder along the support journal to effect a tracking operation for the optical pickup;

two magnetic inductive members for generating a magnetic restoring effect in cooperation with the corresponding magnetized magnet such that the lens holder is held at a neutral position after a predetermined movement; and two yokes for causing the magnetic inductive members provided between the magnets and the yokes to form a magnetic circuit by the magnetized magnet and one of the corresponding yokes, one arc-shaped surface is formed on each of the magnets in a focusing direction, and an other arc-shaped surface is formed on each of the yokes in a tracking direction.

2. The magnetic restoring device of claim 1, wherein the base of the voice coil motor comprises a generally U-shaped yoke base, the magnets are disposed on two opposite sides of the U-shaped yoke base, the lens holder is provided between the magnets, the support journal is connected to the base of the voice coil motor, and the yokes and the magnetic inductive members are provided between the magnets and the support journal.

3. The magnetic restoring device of claim 2, wherein the magnets and the yokes are oppositely disposed.

4. The magnetic restoring device of claim 1, wherein the base of the voice coil motor comprises a generally U-shaped yoke base, the magnets are disposed on two opposite sides of the U-shaped yoke base, the lens holder is provided between the magnets, the support journal is connected to the base of the voice coil motor, and the yokes and the magnetic inductive members are provided external to the U-shaped yoke base.

5. The magnetic restoring device of claim 4, wherein the magnets and the yokes are oppositely disposed.

* * * * *